United States Patent [19]

Vanderpool et al.

[11] Patent Number: 5,654,978
[45] Date of Patent: Aug. 5, 1997

[54] PULSE POSITION MODULATION WITH SPREAD SPECTRUM

[75] Inventors: Jeffrey S. Vanderpool; Ryan N. Jensen, both of Colorado Springs, Colo.; Pete O. Peterson, Larkspur, Calif.; Michael Williams, Colorado Springs, Colo.

[73] Assignee: Omnipoint Corporation, Colorado Springs, Colo.

[21] Appl. No.: 146,490

[22] Filed: Nov. 1, 1993

[51] Int. Cl.⁶ .................................................. H04B 1/69
[52] U.S. Cl. .................................................. 375/200
[58] Field of Search .............................. 375/1, 200

[56] References Cited

U.S. PATENT DOCUMENTS

| Re. 27,738 | 8/1973 | Honma et al. | 332/9 R |
|---|---|---|---|
| 3,934,203 | 1/1976 | Schiff . | |
| 4,164,628 | 8/1979 | Ward et al. . | |
| 4,189,677 | 2/1980 | Cooper et al. . | |
| 4,355,399 | 10/1982 | Timor | 375/1 |
| 4,418,393 | 11/1983 | Zachiele, Jr. | 364/724 |
| 4,506,372 | 3/1985 | Massey | 375/116 |
| 4,550,414 | 10/1985 | Guinon et al. | 375/1 |
| 4,561,089 | 12/1985 | Rouse et al. | 370/18 |
| 4,563,774 | 1/1986 | Gloge et al. | 455/607 |
| 4,587,662 | 5/1986 | Langewellpott | 375/1 |
| 4,641,317 | 2/1987 | Fullerton | 375/1 |
| 4,688,210 | 8/1987 | Eizenhöfer et al. | 370/18 |
| 4,774,715 | 9/1988 | Messanger | 375/1 |
| 4,807,222 | 2/1989 | Amitay | 370/85 |
| 4,813,057 | 3/1989 | Fullerton | 375/37 |
| 4,918,689 | 4/1990 | Hui | 370/85.9 |
| 4,979,170 | 12/1990 | Gilhousen et al. | 370/104.1 |
| 4,979,186 | 12/1990 | Fullerton | 375/23 |
| 5,157,686 | 10/1992 | Omura et al. | 375/1 |
| 5,166,952 | 11/1992 | Omura et al. | 375/1 |
| 5,253,268 | 10/1993 | Omura et al. | 375/1 |
| 5,299,227 | 3/1994 | Rose | 375/1 |
| 5,353,303 | 10/1994 | Walthall | 375/1 |
| 5,392,287 | 2/1995 | Tiedemann, Jr. et al. | 370/95.1 |

FOREIGN PATENT DOCUMENTS

| 9318596 | 6/1993 | WIPO | H04J 3/16 |
|---|---|---|---|
| 9512943 | 5/1995 | WIPO | H04L 25/02 |

OTHER PUBLICATIONS

Unkauf, Manfred G., *Surface Wave Devices in Spread Spectrum Systems*, Surface Wave Filters (Wiley 1977), pp. 477–509.

Dixon, R. *Spread Spectrum Systems with Commercial Applications* (J. Wiley & Sons, 3d ed. 1994).

Dixon, Robert C., *Spread Spectrum Systems*, (J. Wiley & Sons, 2d ed. 1984).

*Primary Examiner*—Salvatore Cangialosi
*Attorney, Agent, or Firm*—Lyon & Lyon

[57] ABSTRACT

A method of pulse-position modulation in a spread-spectrum communication system, which is capable of transmitting more than one bit per received and recognized chip sequence in a system in which an entire chip sequence is required to produce a correlation pulse. A framing pulse window in which a framing pulse may be received, and a plurality of data pulse windows in which a data pulse may (or may not) be received. The delay between the framing pulse window and the first data pulse window may comprise an entire chip-sequence duration, while the delay from one data pulse window to the next may be less. A method of pulse-position modulation with more than one spread-spectrum code. A second transmission medium (such as a second spread-spectrum code) on which a data pulse may (or may not) be received. Each possible choice, for the data pulse, of delay time and transmission code may represent a separate set of multiple data bits. A method of transmitting signals in a spread-spectrum communication system in which a spread-spectrum chip sequence may be interrupted with reduced noise. The system may ground the transmitter antenna at the end of a chip sequence when it is desired to delay transmission of the next chip sequence.

15 Claims, 2 Drawing Sheets

PULSE POSITION MODULATION WITH SPREAD SPECTRUM

BACKGROUND OF THE INVENTION

1. Field of the Invention

This invention relates to pulse-position modulation in a spread-spectrum communication system.

2. Description of Related Art

In pulse-position modulation, a time delay between a first pulse and a second pulse is used to encode data. For example, a short time delay between the first and second pulses may indicate a logical "0", while a long time delay may indicate a logical "1". Successive time delays between successive pulses may be used to encode a stream of data bits. The receiver is able to determine the encoded stream of data bits by measuring the time delays between successive pulses.

In spread-spectrum modulation, a pseudo-random chip sequence is used to encode data. The resulting encoded signal is generally spread across a spectrum bandwidth which substantially exceeds the data-transfer rate, hence the term "spread-spectrum". The receiver produces a correlation pulse in response to the received spread-spectrum signal when it is able to match the chip sequence to a sufficient degree. Spread-spectrum communication often takes place in a noisy transmission environment.

One problem which has arisen in spread-spectrum communication is distinguishing those pulses which are produced by a true signal from those which are produced in response to noise, echoing, or other causes. One solution adopted by the assignee is to modulate each data bit with the entire chip sequence. This method is advantageous in reducing problems associated with synchronizing transmitter and receiver. However, to achieve a high data transmission rate, it requires a high transmission rate for the chip sequence.

Pulse-position modulation would appear well suited to a high data rate. However, in spread-spectrum communication, precise timing of the incoming signal can be degraded due to the requirement of generating a correlation pulse at the receiver. Moreover, in a system where each data bit is modulated with the entire chip sequence, delays between received pulses of less than the entire chip sequence in length would be difficult.

Accordingly, it would be advantageous to transmit data in a noisy environment, at a high data transmission rate, in which true pulses are easily distinguished from false, and in which synchronization between transmitter and receiver is easily achieved.

SUMMARY OF THE INVENTION

The invention provides for pulse-position modulation in a spread-spectrum communication system. The invention also provides a system which is capable of transmitting more than one bit per received and recognized chip sequence in a system in which an entire chip sequence is required to produce a correlation pulse. The system may comprise a framing pulse window in which a framing pulse may be received, and a plurality of data pulse windows in which a data pulse may (or may not) be received. In a preferred embodiment, the delay between the framing pulse window and the first data pulse window may comprise an entire chip-sequence duration, while the delay from one data pulse window to the next may be less.

The invention also provides for pulse-position modulation with more than one spread-spectrum code. The system may comprise a second transmission medium (such as a second spread-spectrum code) on which a data pulse may (or may not) be received. In a preferred embodiment, each possible choice, for the data pulse, of delay time and transmission code may represent a separate set of multiple data bits.

The invention also provides for transmitting signals in a spread-spectrum communication system in which a spread-spectrum chip sequence may be interrupted with reduced noise. In a preferred embodiment, the system may ground the transmitter antenna at the end of a chip sequence when it is desired to delay transmission of the next chip sequence.

DESCRIPTION OF THE PREFERRED EMBODIMENT

Figure 1:
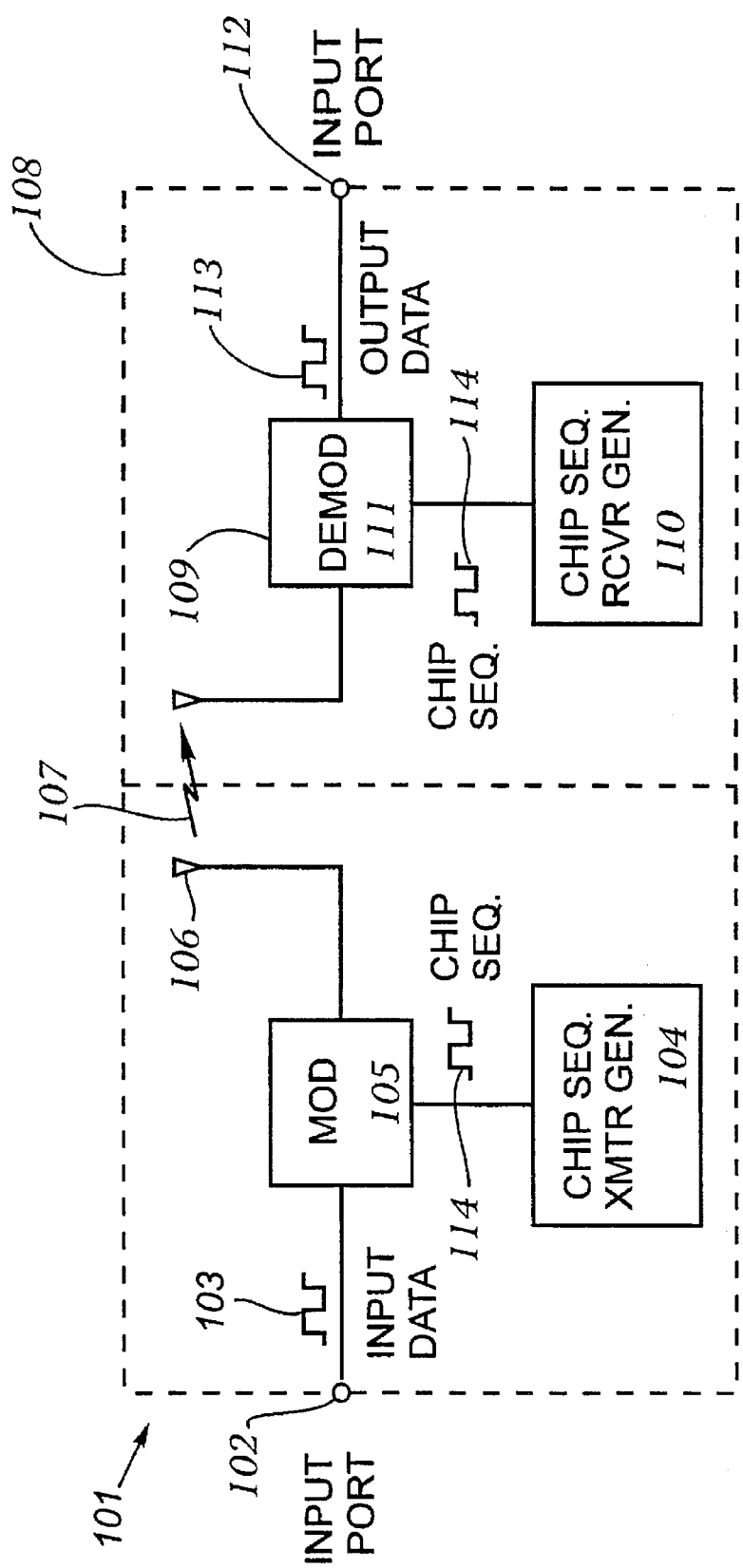
FIG. 1 shows a block diagram of a spread-spectrum communication transmitter and receiver.

FIG. 1 shows a block diagram of a spread-spectrum communication transmitter and receiver.

A spread-spectrum transmitter 101 may comprise an input port 102 for input data 103, a chip sequence transmitter generator 104, a modulator 105, and a transmitting antenna 106 for transmitting a spread-spectrum signal 107. A spread-spectrum receiver 108 may comprise a receiver antenna 109, a chip sequence receiver generator 110, a demodulator 111, and an output port 112 for output data 113. In a preferred embodiment, a single chip sequence 114 is identically generated by both the transmitter generator 104 and the receiver generator 110, and appears essentially random to others not knowing the spreading code upon which it is based. An extensive discussion of spread-spectrum communication, spreading codes, and chip sequences, may be found in R. Dixon, SPREAD SPECTRUM SYSTEMS (1984).

FRAMING PULSE WINDOW AND DATA PULSE WINDOWS

Figure 2:
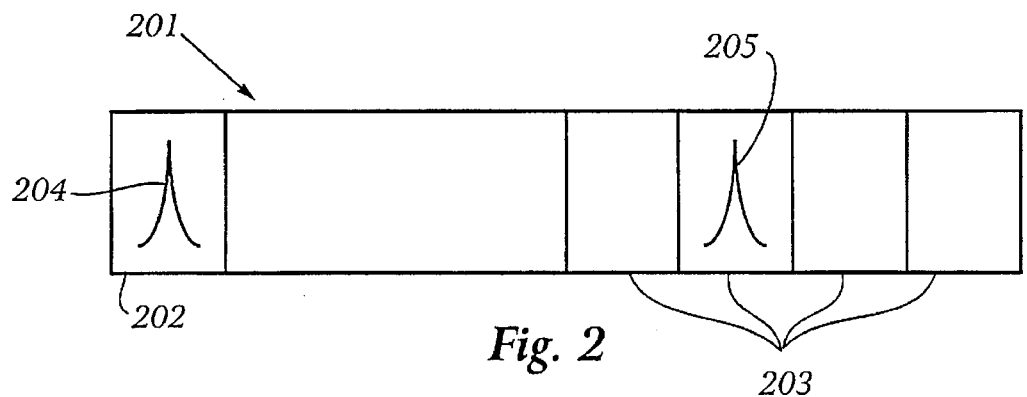
FIG. 2 shows a timing diagram for pulse-position modulation in a spread-spectrum communication system.

FIG. 2 shows a timing diagram for pulse-position modulation in a spread-spectrum communication system.

After spread-spectrum communication is established, the transmitter 101 and the receiver 108 may agree upon a timing window 201 for pulse-position modulation of data. The timing window 201 may comprise a framing pulse window 202 at or near the beginning of the timing window 201, and at least one data pulse window 203 following the framing pulse window 202. In a preferred embodiment, the framing pulse window 202 may comprise the time slot beginning with the start of the timing window 201 and continuing for 651 nanoseconds thereafter. In a preferred embodiment, there may be eight data pulse windows 203, each lasting 651 nanoseconds and each beginning at 5.208 microseconds, plus a multiple of (0, 1, 2, 3, 4, 5, 6, or 7 times) 651 nanoseconds, after the beginning of the timing window 201 respectively.

To perform pulse-position modulation, the transmitter 101 may transmit a framing pulse 204 during the framing pulse window 202. Because the framing pulse window 202 must occur at a known time, the receiver 108 may reject as false all pulses which it detects outside the framing pulse window 202. (Alternatively, it may treat such pulses as indicating lack of synchronization.) After receiving the framing pulse 204, the receiver 108 may look for a data pulse 205 during one of the data pulse windows 203. Similarly, because the data pulse 205 must occur at one of a set of known times, the receiver 108 may reject as false all pulses which it detects outside the data pulse windows 203.

In a preferred embodiment, the receiver 108 determines during which of the data pulse windows 203 the data pulse 205 was received. When there are four data pulse windows 203, there are four possibilities, and the choice of one of those four possibilities by the transmitter 101 gives two bits of information to the receiver 108. If the receiver 108 does not detect the data pulse 205 during any of the data pulse windows 203, it may reject the transmission as indicating an error.

In an alternative embodiment, the receiver 108 may recognize its not receiving the data pulse 205 during any of the data pulse windows 203 as an additional choice available to the transmitter 101. For example, if there is just one data pulse window 205, the presence or absence of the data pulse 205 during the data pulse window 203 would involve a choice of one of those two possibilities, and thus give the receiver 108 one bit of information. If there are three data pulse windows 203, the choice of one of those three possibilities, plus the fourth possibility of not transmitting the data pulse 205 at all, would give the receiver 108 two bits of information.

In a second alternative embodiment, the framing pulse 204 may be omitted. In such an embodiment, the receiver 108 may synchronize its operation with that of the transmitter 101, so the receiver 108 may determine the start of the framing pulse window 202 substantially simultaneously (after allowing for transmission delays) with the transmitter 101, and so the receiver 108 may determine the timing of the data pulse windows 203 substantially simultaneously (after allowing for transmission delays) with the transmitter 101.

In a preferred embodiment, the entire chip sequence 114 of 64 chips may be used to generate a correlation pulse, and the correlation pulse may be adjusted in duration increments of eight chips. At a transmission rate of about 192 KHz, it takes about 5.208 microseconds to transmit the entire chip sequence 114, so the offset between the beginning of the framing pulse window 202 and the beginning of the first data pulse window 203 is therefore 5.208 microseconds. However, if the chip sequence 114 is not started immediately after the framing pulse 202 is generated, the start time may be offset by only a small amount. The offset between the successive data pulse windows 203 is therefore only 651 nanoseconds.

MORE THAN ONE SPREAD-SPECTRUM CODE

Figure 3:
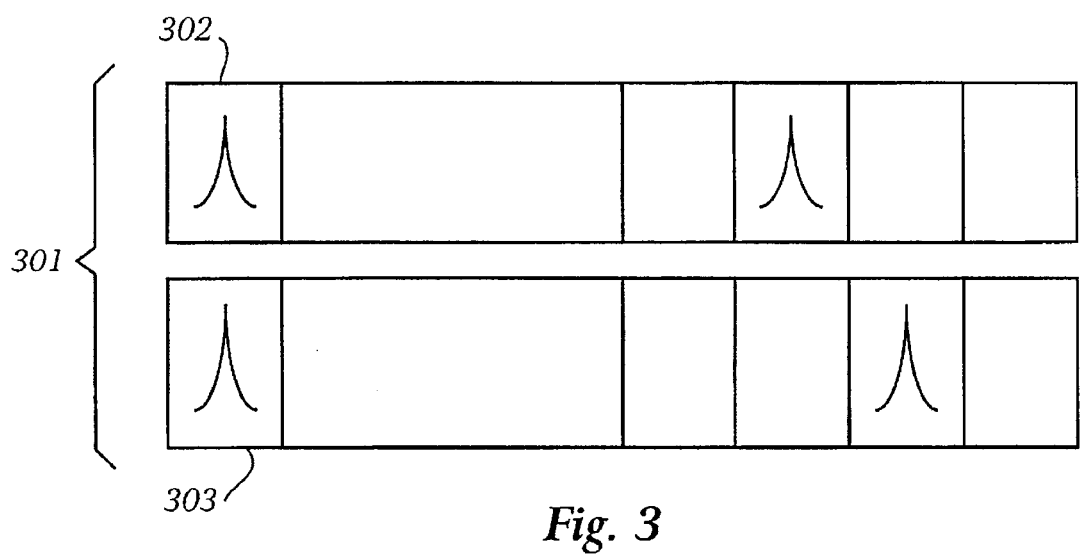
FIG. 3 shows a timing diagram for pulse-position modulation with more than one spread-spectrum code.

FIG. 3 shows a timing diagram for pulse-position modulation with more than one spread-spectrum code.

The transmitter 101 and the receiver 108 may also agree to use more than one transmission medium for pulse-position modulation. In a preferred embodiment, the transmitter 101 and the receiver 108 may agree upon a plurality of spread-spectrum codes 301 for communication. (To reduce false correlations, the plurality of spread-spectrum codes 301 may be pairwise relatively orthogonal.) Due to the nature of spread-spectrum communication, the transmitter 101 may generate signals for each spread-spectrum code essentially independently, and the receiver 108 may receive these signals essentially independently, as if they were transmitted and received on separate media.

To perform pulse-position modulation with more than one spread-spectrum code 301, the transmitter 101 may transmit the framing pulse 204 during the framing pulse window 202 and with a first code 302. It is not necessary to transmit the framing pulse 204 during the framing pulse window 202 and with a second code 303, because the receiver 108 may determine the time from only a single framing pulse 204. After receiving the framing pulse 204, the receiver 205 may look for the data pulse 205 during one of the data pulse windows 203 on either the first code 302 or the second code 303. (In a preferred embodiment, two spread-spectrum codes 301 are used, but this disclosure applies equally well to techniques which use more than two spread-spectrum codes 301.)

In a preferred embodiment, the receiver 108 determines during which of the data pulse windows 203, and on which of the spread-spectrum codes 301, the data pulse 205 was received. When there are four data pulse windows 203 and two spread-spectrum codes 301, there are eight possibilities, and the choice of one of those eight possibilities by the transmitter 101 gives three bits of information to the receiver 108. If the receiver 108 does not detect the data pulse 205 during any of the data pulse windows 203, on any of the spread-spectrum codes 301, it may reject the transmission as indicating an error.

In an alternative embodiment, the receiver 108 may recognize its not receiving the data pulse 205 during any of the data pulse windows 203, for any of the spread-spectrum codes 301, as an additional choice available to the transmitter 101. The receiver would thus be able to interpret such an event similar to its treatment of failing to receive the data pulse 205 when using only one of the spread-spectrum codes 301.

In a second alternative embodiment, the receiver may recognize receiving the data pulse 205 separately for each of the spread-spectrum codes 301. Thus, after receiving the framing pulse 204 for the first spread-spectrum code 302, the receiver 108 may detect the data pulse 205 during one of the data pulse windows 203 for the first spread-spectrum code 302 and during one of the data pulse windows 203 for the second spread-spectrum code 303. When there are four data pulse windows 203 and two spread-spectrum codes 301, there are sixteen possibilities, and the choice of one of those sixteen possibilities by the transmitter 101 gives four bits of information to the receiver 108.

In a third alternative embodiment, more than one communication path may be used in place of the more than one spread-spectrum code 301. For example, transmission noted above to be using the first code 302 may use spread-spectrum techniques, while transmission noted above to be using the second code 303 may be replaced with other techniques, e.g., one of the following:

transmission using narrowband techniques;

transmission using spread-spectrum techniques using a different set of frequencies;

transmission using spread-spectrum techniques using a different set of multiplexed time slots;

transmission using spread-spectrum techniques over a different communication path (such as in a packet switched network);

transmission using another communication medium (such as wire, coaxial cable, or microwave transmission); or other transmission techniques which can be distinguished by the receiver 108.

In a preferred embodiment, the chip sequence 114 of the first code 302 may be 64 chips, and the chip sequence of the second code 303 may be the same 64 chips, in reverse order.

MINIMIZING NOISE WHEN DELAYING CHIP SEQUENCE

Figure 4:
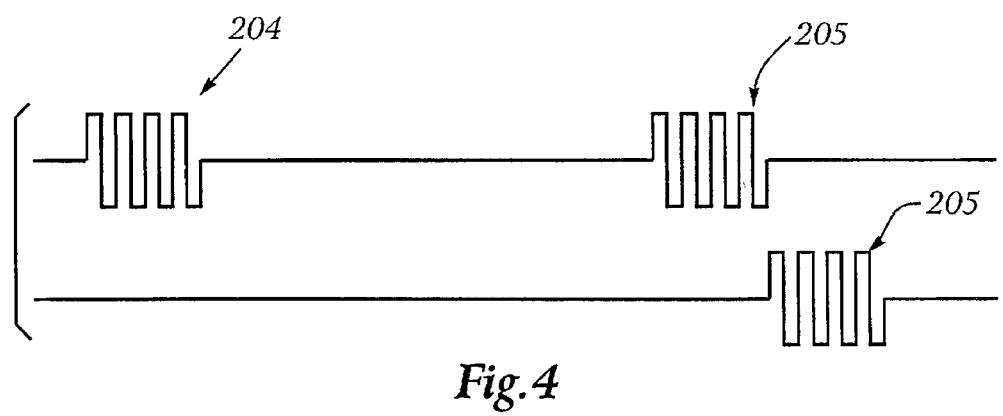
FIG. 4 shows a timing diagram of a transmitted spread-spectrum signal when it is desired to delay transmission of the next chip sequence.

FIG. 4 shows a timing diagram of a transmitted spread-spectrum signal when it is desired to delay transmission of the next chip sequence.

The invention also provides for transmitting signals in a spread-spectrum communication system in which a spread-spectrum chip sequence may be interrupted with reduced noise. In a preferred embodiment, the system may ground the transmitter antenna at the end of a chip sequence when it is desired to delay transmission of the next chip sequence.

ALTERNATIVE EMBODIMENTS

While preferred embodiments are disclosed herein, many variations are possible which remain within the concept and scope of the invention, and these variations would become clear to one of ordinary skill in the art after perusal of the specification, drawings and claims herein.

For example, information which is transmitted from transmitter to receiver is referred to herein as "data", but it would be clear to those of ordinary skill in the art that these data could comprise both data and error-correcting codes, control information, or other signals, and that this would be within the scope and spirit of the invention.

We claim:

1. A method of coherent communication, comprising the steps of transmitting, in each of a plurality of timing windows, a first spread-spectrum pulse during a predefined framing pulse window, said timing windows being of equal time duration;

selecting, in each of said plurality of timing windows, one of a plurality of data pulse windows, responsive to at least one data bit associated with a particular one of said timing windows; and transmitting a second spread-spectrum pulse during the selected data pulse window, said second spread-spectrum pulse indicative of one or more bits of serial data.

2. A method as in claim 1, wherein said first spread-spectrum pulse and said second spread spectrum pulse are generated from the same spread spectrum code.

3. A method as in claim 1, wherein said first spread-spectrum pulse and said second spread spectrum pulse are generated from different spread spectrum codes.

4. A method as in claim 1, further comprising the steps of selecting a second one of said data pulse windows, responsive to said at least one data bit, and transmitting a third spread-spectrum pulse during said second selected data pulse window.

5. A method of communication, comprising the steps of transmitting, in each of a plurality of timing windows of equal time duration, a first entire spread-spectrum chip sequence timed to end during a predefined framing pulse window;

selecting, in each of said plurality of timing windows, one of a plurality of data pulse windows, responsive to at least one data bit associated with a particular one of said timing windows; and transmitting a second entire spread-spectrum chip sequence timed to end during the selected data pulse window, said second spread-spectrum chip sequence indicative of one or more bits of serial data.

6. A system for spread-spectrum communication, comprising a plurality of timing windows of equal time duration, a predefined framing pulse window in each of said timing windows, during which a spread-spectrum framing pulse is received;

a plurality of data pulse windows in each of said timing windows, during each of which a data pulse may be received or not received, wherein receipt of a data pulse in any of said data pulse windows is indicative of a first set of information, and failure to receive a data pulse in any of said data pulse windows is indicative of a second set of information, said first set of information and said second set of information each comprising one or more data bits, a first one of said data pulse windows being offset from said framing pulse window by a predetermined time duration.

7. A system as in claim 6, wherein said data pulse is generated by correlation of a spread spectrum code.

8. A system as in claim 6, wherein said first one of said data pulse windows is offset from said framing pulse window by at least an entire spread-spectrum chip sequence.

9. A system for spread-spectrum communication, comprising a plurality of timing windows of equal time duration, a predefined framing pulse window in each of said timing windows, during which a spread-spectrum framing pulse is received;

a plurality of data pulse windows in each of said timing windows, during each of which a data pulse may be received or not received;

each one of said plurality of data pulse windows being offset from said framing pulse window by a predetermined time duration specific to said one data pulse window.

10. A system as in claim 9, wherein said data pulse is generated by correlation of a spread spectrum code.

11. A system as in claim 9, wherein a first one of said plurality of data pulse windows is offset from said framing pulse window by at least an entire spread-spectrum chip sequence.

12. A system as in claim 9, wherein said plurality of data pulse windows comprises a first and a second data pulse window, and wherein said second data pulse window is offset from said first data pulse window by less than an entire spread-spectrum chip sequence.

13. A system for communication, comprising a timing window;

a predefined framing pulse window within said timing window, during which a first spread-spectrum signal is received; and a plurality of predefined data pulse windows within said timing window, said data pulse windows following said framing pulse window, wherein receipt of a second spread-spectrum signal during a selected one of said data pulse windows is indicative of a first plurality of serial data bits, and wherein failure to receive said second spread-spectrum signal during one of said data pulse windows is indicative of a second plurality of serial data bits.

14. A system as in claim 13, wherein a relationship of a number of said data pulse windows M to a number of said data bits N is $N \leq \log_2 M$.

15. A system as in claim 13, wherein said first spread-spectrum signal and said second spread-spectrum signal comprise the same spread spectrum code.

* * * * *